United States Patent

[11] 3,623,076

[72] Inventors Jerrell F. Moffitt;
Algernon S. Badger; Paul I. Madeley, all of Houston, Tex.
[21] Appl. No. 857,087
[22] Filed Sept. 11, 1969
[45] Patented Nov. 23, 1971
[73] Assignee GEO Space Corporation

[54] METHOD AND APPARATUS FOR TESTING A-TO-D CONVERTERS
9 Claims, 3 Drawing Figs.

[52] U.S. Cl. .................................................... 340/347 AD
[51] Int. Cl. ..................................................... H03k 13/00
[50] Field of Search .......................................... 325/363, 67; 340/347; 235/154

[56] References Cited
UNITED STATES PATENTS
3,314,015  4/1967  Simone ........................ 235/154
3,427,444  2/1969  Tang ............................ 325/38

OTHER REFERENCES
Analog to Digital Conversion Handbook, by Stephenson, Copyright 1964, by Digital Equip. Corp., pages 62-65.

Primary Examiner—Maynard R. Wilbur
Assistant Examiner—Jeremiah Glassman
Attorneys—Michael P. Breston and Alfred B. Levine ABSTRACT: A method and apparatus for testing an A-to-D converter by applying to the A-to-D converter a DC test signal whose amplitude is varied and which is modulated by an AC signal. The output digital data from the A-to-D converter is applied to a D-to-A converter and then displayed for monitoring the distortions of the A-to-D converter.

PATENTED NOV 23 1971
3,623,076
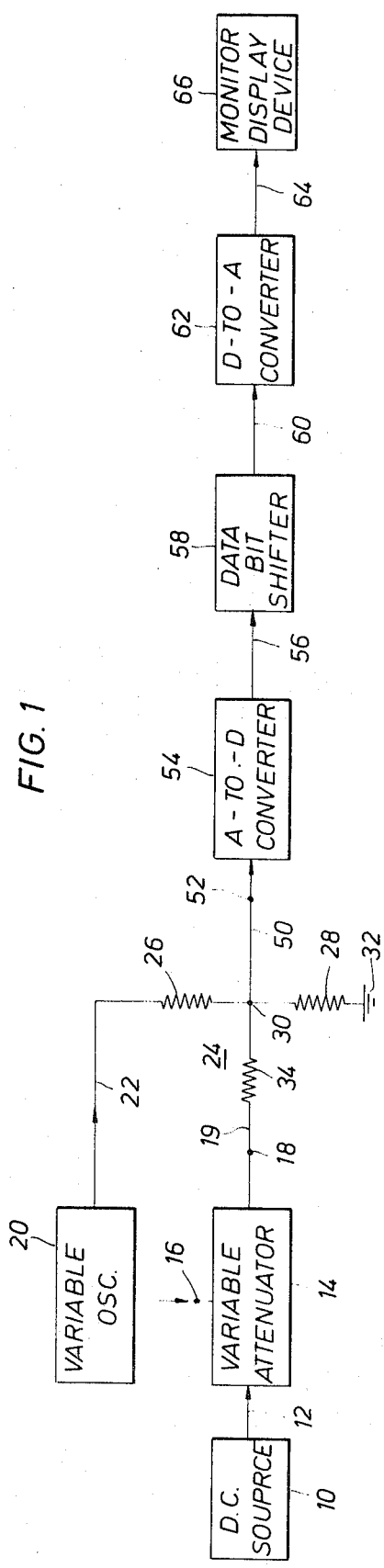
FIG. 1
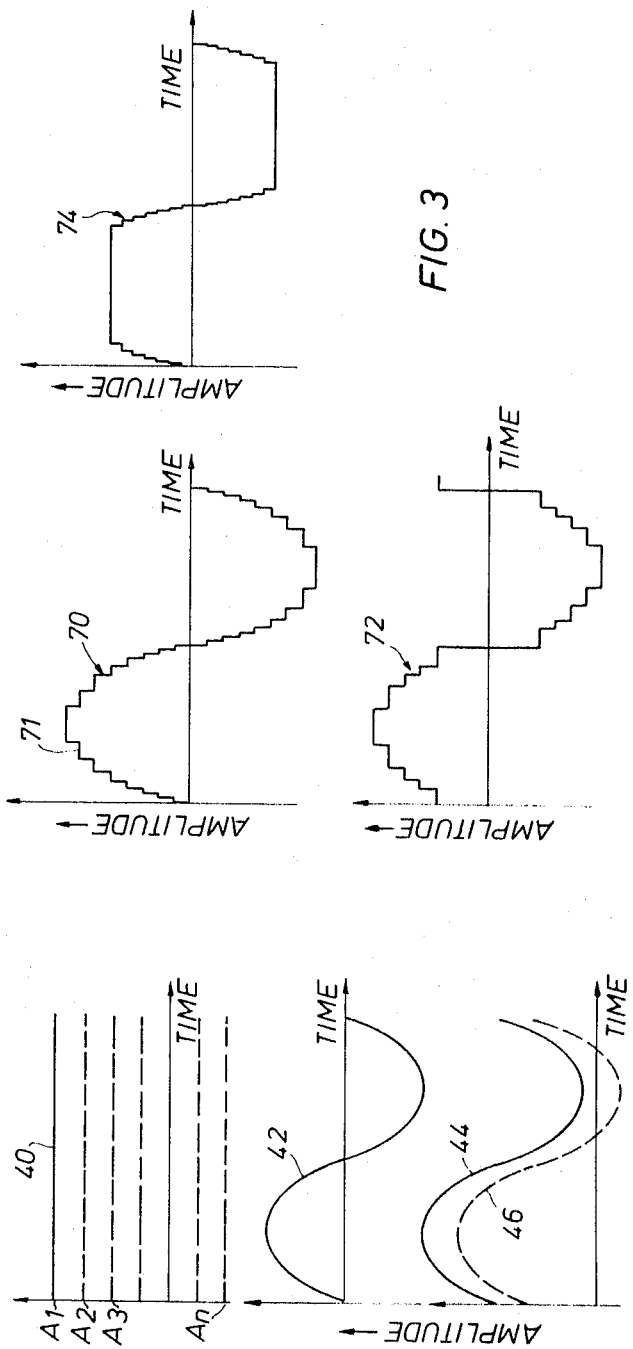
FIG. 3
FIG. 2
Jerrell F. Moffitt
Algernon S. Badger
Paul E. Madeley
INVENTORS
BY Michael P. Breston
ATTORNEY

METHOD AND APPARATUS FOR TESTING A-TO-D CONVERTERS

BACKGROUND OF THE INVENTION

In data acquisition systems in which many analog channels receive analog signals, there is a rapidly growing trend to employ digital computers for sorting, storing and processing the collected data. While such data acquisition systems perform reliably most of the time, certain of their subsystems experience periodic malfunctions. This invention is concerned only with the malfunctions of the subsystem including the A-to-D converter. In a data channel using an A-to-D converter in which no malfunction exists, an original analog signal is first converted to digital data and then reconverted to an analog signal in such a manner that the reconverted signal is a replica of the original signal.

If the A-to-D converter in the channel malfunctions, severe distortions may occur in the reconverted signal. For example, the output of the A-to-D converter may not provide all the required binary digits or bits. On the other hand, the output of the A-to-D converter may not change even though the input to the A-to-D converter is not detected until after the digital data resulting from the analog data has been processed.

To duplicate the original analog data may be very expensive even if it were possible. Accordingly, there is a great need for a relatively simple and reliable method and apparatus for testing A-to-D converters, preferably by a method which can be performed by relatively unskilled technicians.

SUMMARY OF THE INVENTION

A method and apparatus are provided for testing an analog-to-digital converter. A DC signal is discretely varied in dependence on the characteristic of the A-to-D converter. Superimposed on the DC signals is a small AC signal. The combined DC and AC signal is applied to the A-to-D converter under test. The output digital data from the A-to-D converter is suitably amplified, reconverted into analog data by a digital-to-analog converter and displayed on a suitable medium. The display will indicate the amount of distortion existing in the A-to-D converter under test.

BRIEF DESCRIPTION OF THE DRAWINGS

FIG. 1 shows in block diagram form a preferred system for testing A-to-D converters in accordance with the method of this invention;

FIG. 2 shows the test signal applied to the A-to-D converter under test; and

FIG. 3 shows typical monitored displays which may be obtained with the system of FIG. 1.

In FIG. 1 is shown a preferred apparatus for testing an A-to-D converter in a data acquisition channel such as a seismic data channel. The preferred method of this invention is based on applying to the A-to-D converter under test an input test signal which is an AC signal superimposed on a DC signal. The level of the DC signal is changed discretely to allow for the complete testing of the A-to-D converter at different levels throughout its entire operating range.

A DC source 10 of voltage or current provides an output on line 12 to a variable attenuator 14, the amount of attenuation of which can be varied manually by switching or by a programmed signal applied to an input 16. The output terminal 18 of attenuator 14 is connected to output line 19.

A variable AC oscillator 20 provides to its output line 22 an AC signal the frequency and amplitude of which can be adjusted depending on the characteristics of the A-to-D converter under test. To combine the AC signal on line 22 with the DC signal on line 19, there is provided a summing network generally designated as 24 which includes a pair of resistors 26, 28 having a junction 30. The lower end of resistor 28 is connected to ground 32. Connected between output terminal 18 and junction 30 is a resistor 34.

Each discrete level of the DC signal supplied to output line 19 should have an amplitude value which corresponds to a level in the A-to-D converter at which a discontinuity or malfunctioning may occur. The amplitude of the AC signal supplied on line 22 should be preferably on the order of 10 times the value of the least significant bit. In other words, the amplitude of the selected AC signal should be sufficiently large to allow for easy visual inspection at the monitoring station, and yet sufficiently small to allow even an error in the least significant bit to be clearly visible. For convenience the waveform of the AC signal is sinusoidal at a frequency within the passband of the A-to-D converter. The resistors 26, 28 and 34 may be made variable if desired to allow for greater flexibility in shaping the input test signal into the A-to-D converter.

Referring to FIG. 2, curve 40 represents the DC signal on line 19 for one setting of the variable attenuator 14. The DC signal has an amplitude level $A_1$ from which it is varied discretely to $A_2, A_3...A_n$, where A can be positive or negative with respect to ground 32; curve 42 represents the AC signal on line 22; curve 44 represents the combined signal composed of the DC signal 40 and the AC signal 42; curve 44 corresponds to the amplitude $A_1$; and curve 46 shown by dotted lines corresponds to the amplitude $A_2$. The other combined curves resulting from shifting the DC level from $A_3$ to $A_n$ are not shown in FIG. 2 to simplify the drawing.

The combined signal such as 44 is applied from junction 30 via line 50 to input terminal 52 of the A-to-D converter 54 undergoing test. Converter 54 will convert the incoming analog signal 44 into binary digits or bits which are fed to a plurality of output parallel lines 56 only one of which is shown. The digital data on lines 56 is fed to a digital data bit shifter 58 which may be a shift register. The output from shifter 58 is applied via line 60 to a digital-to-analog converter 62. The D-to-A converter 62 provides a reconverted analog signal on line 64 which is displayed on a monitor display device 66 which may be a CRT tube, an oscillograph, or other recording instrument.

In operation, the purpose for employing a data bit shifter 58 is to significantly amplify the digital data from the A-to-D converter 54. With a data bit shifter 58, a relatively high-quality D-to-A converter 62 is not required. The data bit shifter 58 may be considered as a digital amplifier. For example, a relatively small-amplitude AC signal may be amplified say 500 to 1,000 times to obtain a waveform which can be studied by the naked eye to detect imperfections in the operation of the A-to-D converter 54.

In FIG. 3, when the A-to-D converter 54 functions properly, the output analog waveform 70 will be an amplified replica of the input small-amplitude AC signal 42; the DC signal 40 does not pass through the shifter 58. Since only discrete points in the input analog signal 44 are sampled and converted by the A-to-D converter 54, the output signal 70 contains a staircase ripple 71. When the A-to-D converter skips bits, the output curve on the display device 66 will be a distorted curve 72. On the other hand, when the A-to-D converter 54 does not provide for a change in the input analog signal a corresponding bit change, then the output curve on display device 66 may be a curve such as 74. Curves 72 and 74 are only particular examples of the types of distortions which may be encountered. In any event, the malfunctioning of the A-to-D converter under test will be automatically displayed. The operator will then proceed with the required service to restore the proper operation to the A-to-D converter.

Since in data acquisition systems most of the blocks shown in FIG. 1 are already required for the proper processing of the incoming analog data signals, it will be appreciated that the method of the present invention can be conveniently carried out by operators of data acquisition systems either in central offices or in the field, where the original analog data is gathered and digitally processed. Since an early malfunction of the A-to-D converter can be readily detected, the quality of the processed data will be greatly improved. The risk of losing valuable original analog data because of A-to-D converter malfunctioning is now substantially eliminated.

What we claim is:

1. A method of testing an A-to-D converter comprising the steps of:
    applying at least one input analog test signal to the A-to-D converter under test for converting said analog signal to a digital signal,
        said analog test signal having a DC component and an AC component, said DC component having an amplitude corresponding to a level in said A-to-D converter at which a discontinuity occurs;
    applying said digital signal to a D-to-A converter for converting said digital signal to a reconverted analog signal, and eliminating said DC component from the reconverted analog signal; and
    monitoring the AC component of said reconverted analog signal to obtain an indication of the operation of said A-to-D converter.

2. The method of claim 1 wherein said DC component in said reconverted analog signal is eliminated by amplifying said digital signal prior to applying said digital signal to said D-to-A converter.

3. The method of claim 2 wherein,
    said monitoring step includes the step of visually displaying said AC component.

4. The method of claim 1 wherein said DC component in said reconverted analog signal is eliminated by shifting said digital signal prior to applying said digital signal to said D-to-A converter.

5. A system for testing an A-to-D converter comprising:
    energy means for applying at least one input analog test signal to the A-to-D converter under test for converting said analog signal to a digital signal,
        said analog test signal having a DC component and an AC component, said DC component having an amplitude corresponding to a level in said A-to-D converter at which a discontinuity occurs;
    means including a D-to-A converter for converting said digital signal to a reconverted analog signal, and eliminating said DC component from the reconverted analog signal; and
    means monitoring the AC component of said reconverted analog signal to obtain an indication of the operation of said A-to-D converter.

6. The system of claim 6 and further including,
    amplifying means for amplifying said digital signal prior to applying said digital signal to said D-to-A converter, thereby eliminating said DC component.

7. The system of claim 6 wherein said energy means includes:
    a variable DC source;
    an AC source; and
    means for combining the DC output of said DC source with the output of said AC source.

8. The system of claim 6 and further including,
    data bit shifting means for shifting said digital signal prior to applying said digital signal to said D-to-A converter, thereby eliminating said DC component.

9. The system of claim 6 wherein,
    said monitoring means provides a visual display of said reconverted analog signal.

* * * * *